United States Patent
Zou

(10) Patent No.: US 12,044,051 B2
(45) Date of Patent: Jul. 23, 2024

(54) VARIABLE TORSION SPRING DAMPING ROTATING SHAFT

(71) Applicant: OPPLE LIGHTING CO., LTD., Shanghai (CN)

(72) Inventor: Donghong Zou, Shanghai (CN)

(73) Assignee: OPPLE LIGHTING CO., LTD., Shanghai (CN)

( * ) Notice: Subject to any disclaimer, the term of this patent is extended or adjusted under 35 U.S.C. 154(b) by 421 days.

(21) Appl. No.: 17/402,124

(22) Filed: Aug. 13, 2021

(65) Prior Publication Data

US 2021/0372462 A1    Dec. 2, 2021

Related U.S. Application Data

(63) Continuation of application No. PCT/CN2019/130457, filed on Dec. 31, 2019.

(30) Foreign Application Priority Data

Feb. 14, 2019    (CN) .......................... 201920198586.5

(51) Int. Cl.
     *E05D 11/10*      (2006.01)
     *E05F 1/12*      (2006.01)
     *F16F 1/12*      (2006.01)

(52) U.S. Cl.
     CPC .......... *E05D 11/1078* (2013.01); *F16F 1/123* (2013.01); *F16F 2236/08* (2013.01); *Y10T 403/32614* (2015.01)

(58) Field of Classification Search
     CPC .......... F16F 1/123; F16F 1/12; F16F 2236/08; E05D 11/1078; E05F 1/12; E05Y 2201/266; E05Y 2900/132; Y10T 403/32614

(Continued)

(56) References Cited

U.S. PATENT DOCUMENTS 2,345,368 A * 3/1944 Voight ...................... E05F 3/14
     16/DIG. 9
3,001,223 A * 9/1961 Rollitt ...................... E05F 3/14
     188/281

(Continued)

FOREIGN PATENT DOCUMENTS

CN      201836280 U    5/2011
CN      205258862 U    5/2016

(Continued)

OTHER PUBLICATIONS

International Search Report of PCT Application No. PCT/CN2019/130457 dated Mar. 26, 2020 with English translation, (5p).

*Primary Examiner* — Robert A. Siconolfi
*Assistant Examiner* — James K Hsiao
(74) *Attorney, Agent, or Firm* — Arch & Lake LLP

(57) ABSTRACT

The present disclosure discloses a variable torsion spring damping rotating shaft. The shaft includes a movable unit, a fixed unit, a first connection mechanism, a second connection mechanism, and a torsion spring; the fixed unit is detachable in inserting connection with the movable unit; the first connection mechanism is arranged inside the fixed unit, and the first connection mechanism is connected to an end of the fixed unit; the torsion spring is sleeved on the first connection mechanism, an end of the torsion spring is in inserting connection with the fixed unit, and another end of the torsion is in inserting connection with the movable unit; the second connection mechanism is arranged in the movable unit and is in cooperation with the first connection mechanism; and the second connection mechanism is configured to rotate on the first connection mechanism, to drive the movable unit to move towards the fixed unit.

15 Claims, 5 Drawing Sheets

(58) Field of Classification Search
USPC .......................................................... 267/155
See application file for complete search history.

(56) References Cited

U.S. PATENT DOCUMENTS

| | | | | | |
|---|---|---|---|---|---|
| 3,404,426 | A * | 10/1968 | Johnston | ................... | E05F 3/14 16/51 |
| 3,860,993 | A * | 1/1975 | Matuska | ................... | E05F 3/14 16/52 |
| 4,620,620 | A * | 11/1986 | Johnston | ................. | F16F 9/462 74/88 |
| 4,756,051 | A * | 7/1988 | Shy | ........................... | E05F 3/14 16/76 |
| 4,893,522 | A * | 1/1990 | Arakawa | ................. | F16F 15/10 188/290 |
| 5,018,244 | A * | 5/1991 | Hino | ..................... | G06F 1/1616 16/337 |
| 5,109,571 | A * | 5/1992 | Ohshima | ................. | E05D 11/08 16/284 |
| 5,211,269 | A * | 5/1993 | Ohshima | ................... | E05F 3/14 267/221 |
| 5,566,048 | A * | 10/1996 | Esterberg | .............. | G06F 1/1616 16/342 |
| 5,906,010 | A * | 5/1999 | Suzuki | ................... | A47K 13/12 16/342 |
| 5,923,751 | A * | 7/1999 | Ohtsuka | .............. | H04M 1/0218 379/434 |
| 6,052,869 | A * | 4/2000 | Suzuki | ................... | A47K 13/12 4/236 |
| 6,154,924 | A * | 12/2000 | Woo | .......................... | E05F 3/14 16/65 |
| 6,175,990 | B1 * | 1/2001 | Kato | ..................... | G06F 1/1679 16/334 |
| 6,336,252 | B1 * | 1/2002 | Bando | ...................... | F16F 7/06 16/342 |
| 6,601,269 | B2 * | 8/2003 | Oshima | ................. | G06F 1/1616 16/342 |
| 6,817,061 | B2 * | 11/2004 | Wu | ...................... | H04M 1/0216 16/386 |
| 6,829,807 | B2 * | 12/2004 | Kim | .......................... | E05F 3/20 16/322 |
| 6,948,217 | B2 * | 9/2005 | Higano | ................... | G06F 1/1679 16/303 |
| 7,065,834 | B2 * | 6/2006 | Lowry | .................. | G06F 1/1681 16/334 |
| 7,401,381 | B2 * | 7/2008 | Konja | ................... | E05F 1/1016 16/303 |
| 7,596,830 | B2 * | 10/2009 | Yin | ........................ | G06F 1/1616 188/290 |
| 7,743,467 | B2 * | 6/2010 | Wang | ................... | G06F 1/1616 16/295 |
| 8,104,142 | B2 * | 1/2012 | Lowry | .................. | E05D 11/082 16/307 |
| 8,182,055 | B2 * | 5/2012 | Yun | ........................... | E05F 3/14 188/290 |
| 8,408,365 | B2 * | 4/2013 | Biasiotto | .............. | F16C 11/103 188/67 |
| 8,523,131 | B2 * | 9/2013 | Derry | ..................... | F16M 11/18 16/338 |
| 9,206,636 | B2 * | 12/2015 | Nagl | ..................... | E05F 1/1215 |
| 9,371,675 | B2 * | 6/2016 | Oshima | .................. | E05D 3/142 |
| 9,394,645 | B2 * | 7/2016 | Park | ........................ | D06F 39/14 |
| 2009/0064462 | A1 * | 3/2009 | Yin | ........................ | G06F 1/1681 16/330 |
| 2009/0255090 | A1 * | 10/2009 | Kim | ...................... | E05F 1/1207 16/297 |
| 2009/0255091 | A1 * | 10/2009 | Jung | ........................ | E05F 3/14 16/308 |
| 2011/0041285 | A1 * | 2/2011 | Hong | ................... | E05F 1/1215 16/297 |
| 2011/0062837 | A1 * | 3/2011 | Kim | ....................... | D06F 39/14 16/296 |
| 2014/0285076 | A1 * | 9/2014 | Woo | .......................... | D06F 58/20 312/228 |
| 2016/0076292 | A1 * | 3/2016 | Stuart | ................... | E05D 11/082 16/297 |
| 2018/0106087 | A1 * | 4/2018 | Bacchetti | ................. | E05F 3/12 |

FOREIGN PATENT DOCUMENTS

| | | |
|---|---|---|
| CN | 107237092 A | 10/2017 |
| CN | 107237095 A | 10/2017 |
| CN | 107245851 A | 10/2017 |
| CN | 209586923 U | 11/2019 |
| WO | 2012139954 A1 | 10/2012 |

* cited by examiner

VARIABLE TORSION SPRING DAMPING ROTATING SHAFT

TECHNICAL FIELD

This application is based upon and claims the priority of PCT patent application No. PCT/CN2019/130457 filed on Dec. 31, 2019, which claims priority to the Chinese patent application No. 201920198586.5 filed on Feb. 14, 2019, the entire contents of which are hereby incorporated by reference herein for all purposes.

TECHNICAL FIELD

The present disclosure relates to a technical field of a rotating shaft, and in particular, relates to a variable torsion spring damping rotating shaft.

BACKGROUND

In daily applications, for two components having a rotational motion relationship, when it is required that one of the two rotating components is achieved to suspend at any rotation angle, and one of the rotating components is manually pushed, having a damping feel is a common application requirement.

SUMMARY

Examples of the present disclosure provide a variable torsion spring damping rotating shaft and a method of manufacturing a variable torsion spring damping rotating shaft.

In a first aspect, examples of the present disclosure provide a variable torsion spring damping rotating shaft. The shaft may include a movable unit, a fixed unit, a first connection mechanism, a second connection mechanism, and a torsion spring.

The fixed unit may be detachable in inserting connection with the movable unit; the first connection mechanism may be arranged inside the fixed unit, and in a direction away from the movable unit, the first connection mechanism may be connected to an end of the fixed unit; the torsion spring may be sleeved on the first connection mechanism, an end of the torsion spring may be in inserting connection with the fixed unit, and another end of the torsion may be in inserting connection with the movable unit; the second connection mechanism may be arranged in the movable unit and may be in cooperation with the first connection mechanism; and the second connection mechanism may be configured to rotate on the first connection mechanism, to drive the movable unit to move towards the fixed unit.

In a second aspect, examples of the present disclosure provide a method of manufacturing a variable torsion spring damping rotating shaft. The method may include providing a movable unit, a fixed unit, a first connection mechanism, a second connection mechanism, and a torsion spring; providing the fixed unit that is detachable and is in inserting connection with the movable unit; arranging the first connection mechanism inside the fixed unit, and in a direction away from the movable unit, and connecting the first connection mechanism to an end of the fixed unit; sleeving the torsion spring on the first connection mechanism, providing an end of the torsion spring that is in inserting connection with the fixed unit, and providing another end of the torsion that is in inserting connection with the movable unit; arranging the second connection mechanism in the movable unit and in cooperation with the first connection mechanism; and configuring the second connection mechanism to rotate on the first connection mechanism, to drive the movable unit to move towards the fixed unit.

It is to be understood that both the foregoing general description and the following detailed description are exemplary and explanatory only and are not restrictive of the present disclosure.

BRIEF DESCRIPTION OF THE DRAWINGS

The drawings described here are used for providing a further understanding of the present disclosure and constitute a portion of the present disclosure. Examples of the present disclosure and descriptions of examples are used for explaining the present disclosure and do not constitute an improper limitation of the present disclosure. In the drawings.

DETAILED DESCRIPTION

Figure 1:
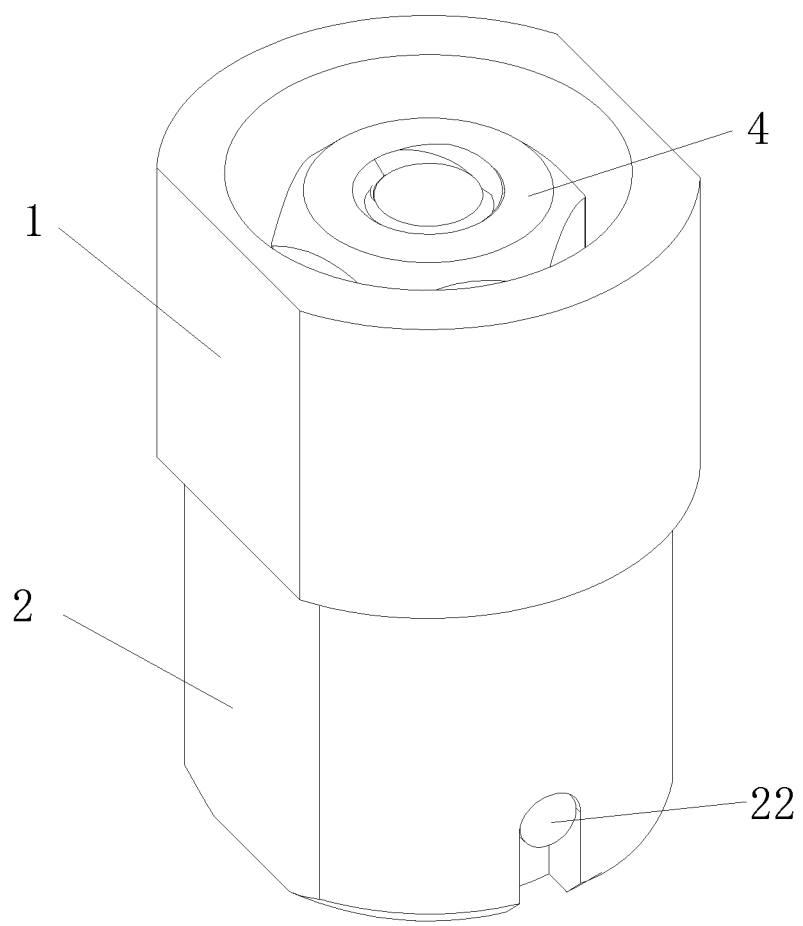
FIG. 1 is a perspective view of a variable torsion spring damping rotating shaft disclosed in an example of the present disclosure.

In order to make the object, technical solution and advantages of the present disclosure clearer, the technical solution of the present disclosure will be clearly and completely described below in combination with examples of the present disclosure and the corresponding drawings. Obviously, the described examples are only a portion of examples of the present disclosure, rather than all examples of the present disclosure. Based on examples of the present disclosure, all other examples obtained by those of ordinary skill in the art without creative work will fall within the protection scope of the present disclosure.

The technical solutions provided by examples of the present disclosure will be described in detail below with reference to the drawings.

The reference numerals used in this disclosure may include:

a movable unit 1, a first through hole 11, a protrusion 12, a second through hole 13, a third through hole 14, an annular groove or an annular through hole 15, a fixed unit 2, a fourth through hole 21, a fifth mounting hole 22, a first connection mechanism 3, a second connection mechanism 4, a torsion spring 5, a rotating part 6, a rotating hole 61, a gasket 7, an adjusting gasket 71, and a flat gasket 72.

Sometimes, a damping rotating shaft is usually sleeved in a housing, the torque of a torsion spring is adjusted by the rotation of a nut on a screw, however, the displacement of the housing does not change, which greatly limits the motion space of the nut and restricts the application of the damping rotating shaft.

Figure 2:
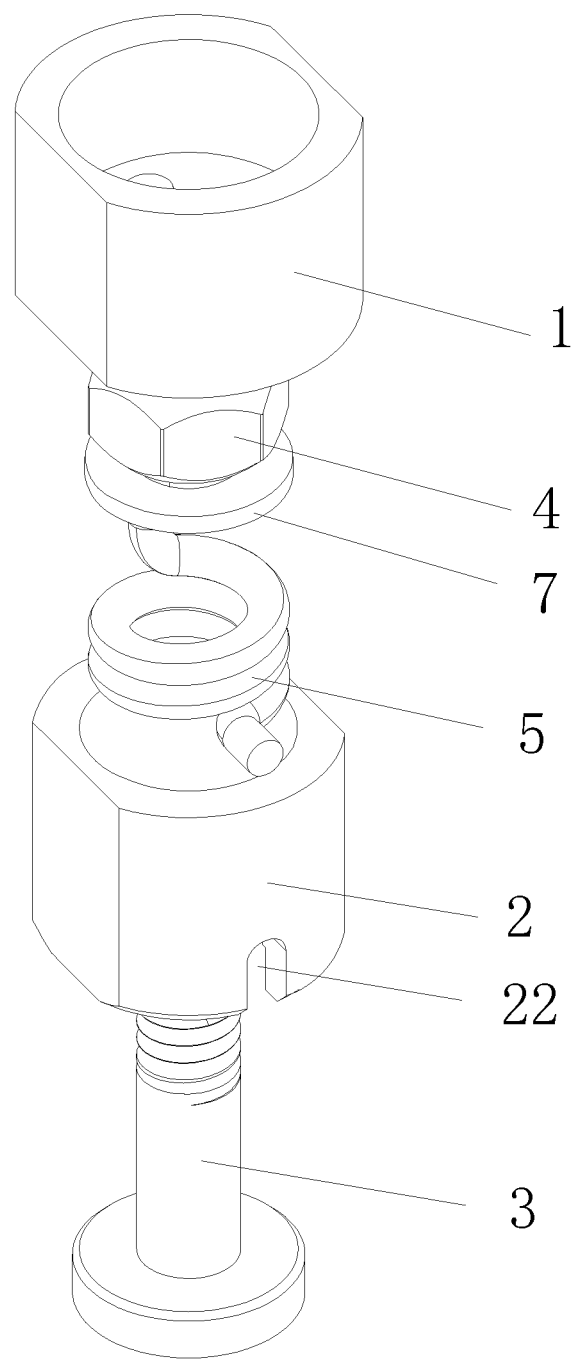
FIG. 2 is a schematic diagram of an exploded structure of the FIG. 1.
Figure 5:
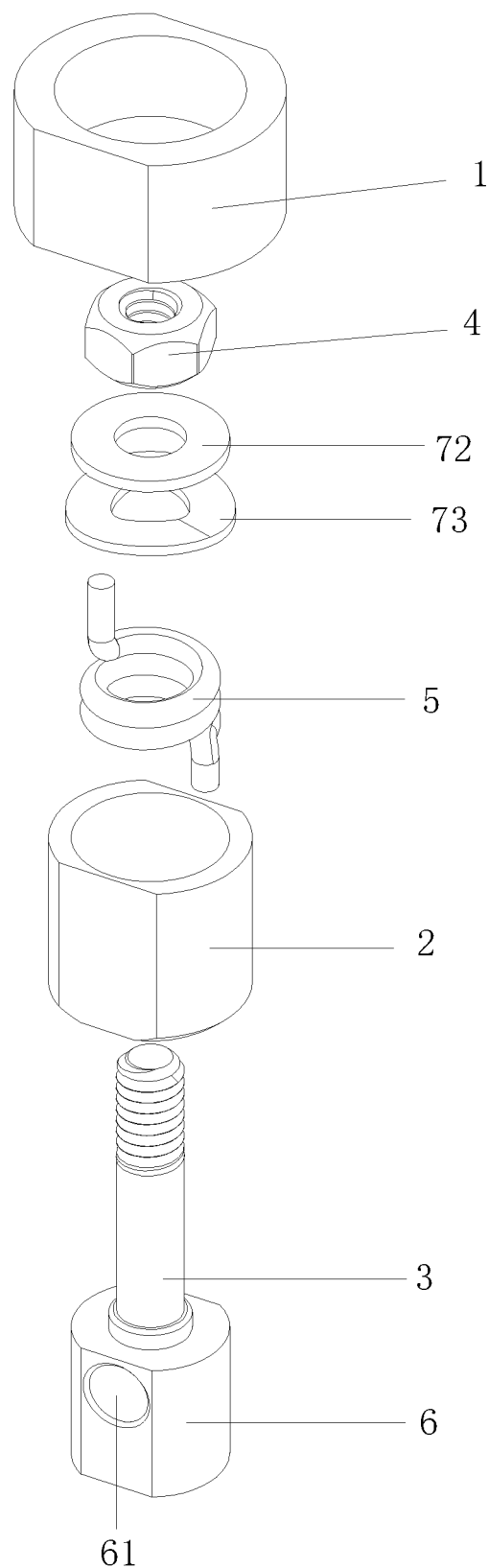
FIG. 5 is a schematic diagram of an exploded structure of a variable torsion spring damping rotating shaft disclosed in another example of the present disclosure.

As shown in FIG. 1, FIG. 2 and FIG. 5, an example of the present disclosure provides a variable torsion spring damping rotating shaft comprising a movable unit 1, a fixed unit 2, a first connection mechanism 3, a second connection mechanism 4, and a torsion spring 5. The fixed unit 2 is detachable in inserting connection with the movable unit 1. The first connection mechanism 3 is arranged inside the fixed unit 2, and in a direction away from the movable unit 1, the first connection mechanism 3 is connected to an end of the fixed unit 2. The torsion spring 5 is sleeved on the first connection mechanism 3, one end of the torsion spring 5 is inserted to the fixed unit 2 to connect with the fixed unit 2, and the other end of the torsion 5 is inserted to the movable unit 1 to connect with the movable unit 1. The second connection mechanism 4 is arranged in the movable unit 1 and is in cooperation with the first connection mechanism 3, and the second connection mechanism 4 is configured to rotate on the first connection mechanism 3 for driving the movable unit 1 to move to the fixed unit 2.

In a case where the first connection mechanism 3 and the fixed unit 2 are designed to be separated, the first connection mechanism 3 is in inserting connection with the fixed unit 2.

Examples of the present disclosure disclose a variable torsion spring damping rotating shaft. By arranging the fixed unit 2 and the movable unit 1 which are detachably installed, when the second connection mechanism 4 rotates on the first connection mechanism 3, the movable unit 1 is driven to move towards the fixed unit 2, and then the motion space of the second connection mechanism 4 is enlarged, the torsion spring can be compressed and extended at the maximum, the application range of the variable torsion spring damping rotating shaft is increased, and the installation and disassembly of the fixed unit 2 and the movable unite 1 are more convenient.

In an example of the present disclosure, a first through hole 11 is arranged in an end of the movable unit 1 in a direction away from the fixed unit 2, and a protrusion 12 is arranged on an end of the movable unit 1 in a direction close to the fixed unit 2. A second through hole 13 is arranged inside the protrusion 12, and the first through hole 11 is communicated with the second through hole 13. The first connection mechanism 3 is inserted into the second through hole 13 and the first through hole 11, and the second connection mechanism 4 is sleeved on the first connection mechanism 3 located in the first through hole 11.

In an example of the present disclosure, in a direction towards the fixed unit 2, a third through hole 14 is arranged in the protrusion 12, the third through hole 14 is communicated with the first through hole 11, and an end of the torsion spring 5 is inserted into the third through hole 14.

In an example of the present disclosure, a contacting opposite end of the movable unit 1 and a contacting opposite end of the fixed unit 2 are flat surfaces, and the two end surfaces abut against each other.

In an example of the present disclosure, in the direction towards the fixed unit 2, an annular groove or an annular through hole 15 is arranged in the movable unit 1, and the fixed unit 2 is inserted into the annular groove or the annular through hole 15.

In an example of the present disclosure, the annular groove or the annular through hole 15 is arranged concentrically with the second through hole 13, and a diameter of the annular groove or a diameter of the annular through hole 15 is larger than a diameter of the second through hole 13. The third through hole 14 is located between the first through hole 11 and the second through hole 13.

In an example of the present disclosure, a fourth through hole 21 is arranged in the fixed unit 2, the fourth through hole 21 is communicated with the first through hole 11 and the second through hole 13, and the first connection mechanism 3 is fixedly arranged in the fourth hole 21.

Figure 4:
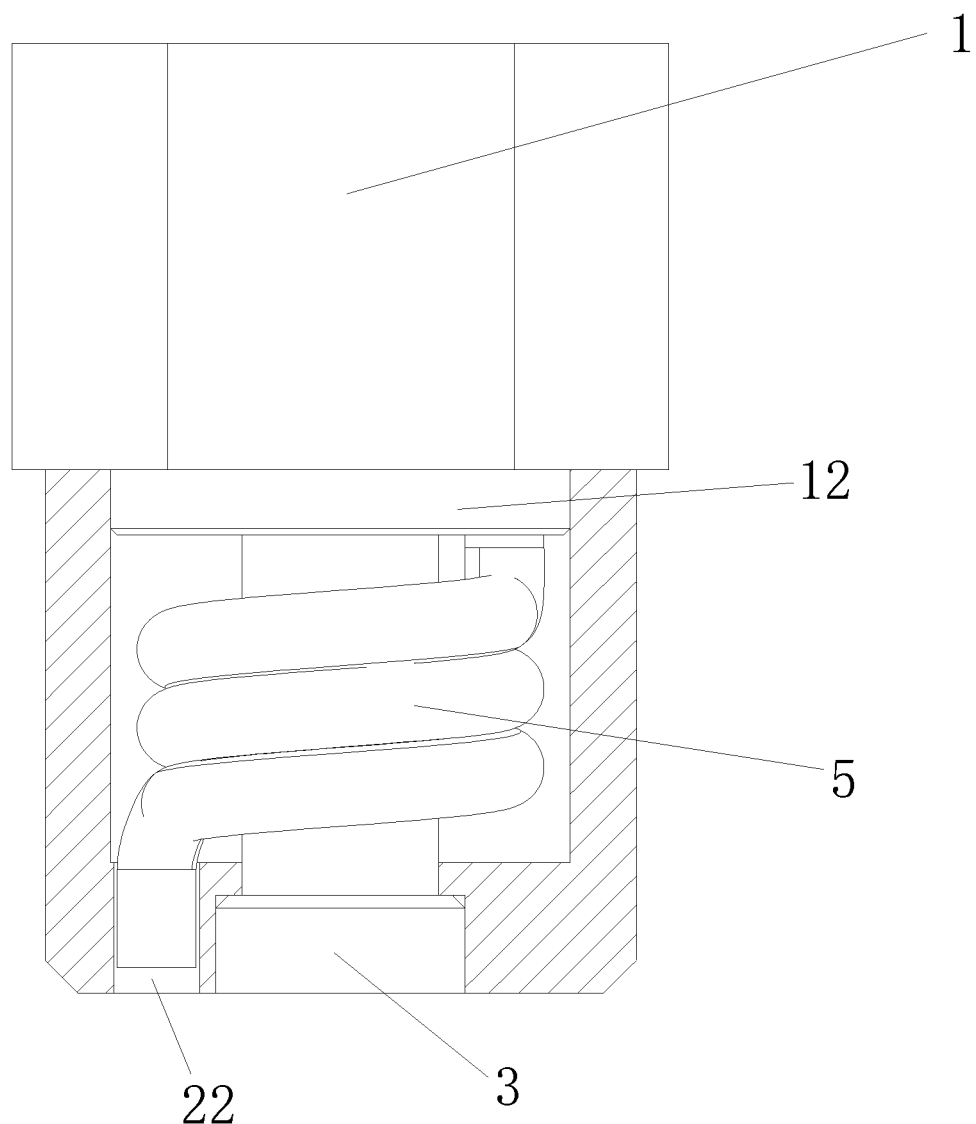
FIG. 4 is a cross-sectional view of a variable torsion spring damping rotating shaft disclosed in another example of the present disclosure.

As shown in FIG. 4, in an example of the present disclosure, a fifth mounting hole 22 is arranged away from the second through hole 13 and in a surface of the fixed unit 2 along a direction of the fourth through hole 21, and the torsion spring 5 is inserted into the fifth mounting hole 22. It can be seen from FIG. 2 that an end of the fifth mounting hole 22 and an end of the first connection mechanism 3 are on the same horizontal plane. The torsion spring 5 is fixed by the fifth mounting hole 22, which is skillfully arranged.

Figure 3:
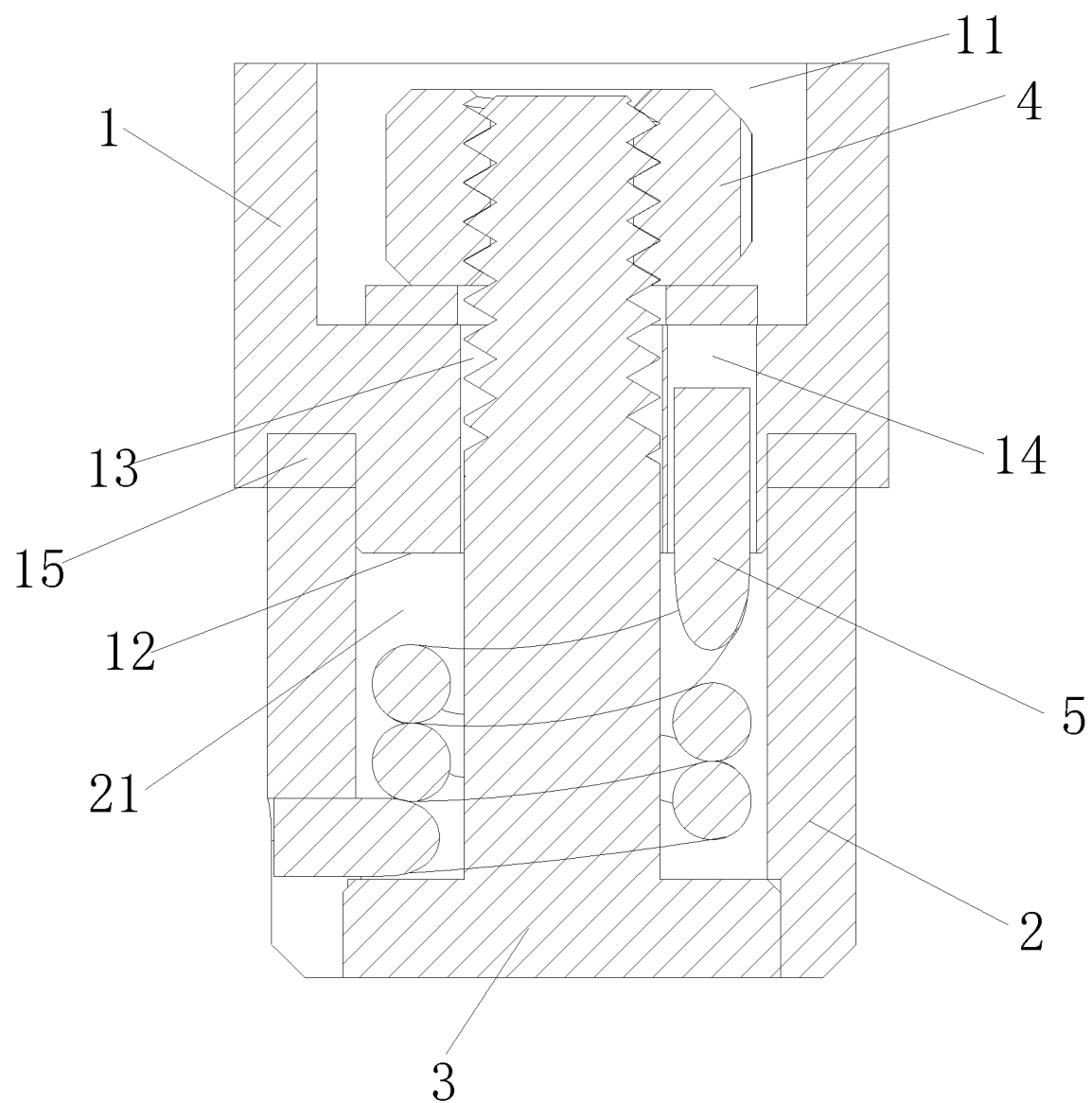
FIG. 3 is a cross-sectional view of a vertical direction of the FIG. 1.

As shown in FIG. 3, in an example of the present disclosure, a fifth mounting hole 22 is arranged away from the second through hole 13 and in a surface of the fixed unit 2 in a direction perpendicular to the fourth through hole 21, and an end of the torsion spring 5 is inserted into the fifth mounting hole 22 to be connected. The torsion spring 5 is fixed by the fifth mounting hole 22, which is skillfully arranged, and the position arrangement of the fifth mounting hole 22 is diversified and more flexible.

As shown in FIG. 5, in an example of the present disclosure, a rotating part 6 is arranged on a side of the first connection mechanism 3 in a direction away from the second through hole 13, and an end of the torsion spring 5 is immediately close to the rotating part 6. Further, a rotating hole 61 is arranged in the rotating part 6 to facilitate hand-holding. The rotating part 6 facilitates the rotating installation of the fixed unit 2 and the first connection mechanism 3.

In an example of the present disclosure, the variable torsion spring damping rotating shaft further includes at least one gasket 7. The gasket 7 is sleeved on the first connection mechanism 3, the gasket 7 is located between the torsion spring 5 and the second connection mechanism 4, and the gasket 7 is located in the first through hole 11.

As shown in FIG. 5, the gasket 7 includes an adjusting gasket 73 and a flat gasket 72. The adjusting gasket 73 adopts a disk structure with a shaft hole. In a case where one adjusting gasket 73 is used for adjusting, the anti-slip effect is achieved by the adjusting gasket 73 and a port of the first connection mechanism 3. In a case where two or more adjusting gaskets 73 are used, bottoms of the disk structures or openings of the disk structures of the two adjusting gaskets 71 are abut against with each other, and therefore the structural tension of the adjusting gasket 71 itself can also be used to enhance the adjustment effect. The flat gasket 72 plays a compact role and can tightly connect the first connection mechanism 3 and the second connection mechanism 4 together.

In an example of the present disclosure, the first connection mechanism 3 is a T-shaped screw, and the second connection mechanism 4 is a nut. A top surface of the T-shaped screw is arranged in the fourth through hole 21 of the fixed unit 2 by interference fit.

Examples of the present disclosure provide a variable torsion spring damping rotating shaft and a method of manufacturing a variable torsion spring damping rotating shaft.

In a first aspect, examples of the present disclosure provide a variable torsion spring damping rotating shaft comprising a movable unit, a fixed unit, a first connection mechanism, a second connection mechanism, and a torsion spring;

the fixed unit is detachable in inserting connection with the movable unit;

the first connection mechanism is arranged inside the fixed unit, and in a direction away from the movable unit, the first connection mechanism is connected to an end of the fixed unit;

the torsion spring is sleeved on the first connection mechanism, an end of the torsion spring is in inserting connection with the fixed unit, and another end of the torsion spring is in inserting connection with the movable unit;

the second connection mechanism is arranged inside the movable unit and is in cooperation with the first connection mechanism; and the second connection mechanism is configured to rotate on the first connection mechanism for driving the movable unit to move towards the fixed unit.

Optionally, for the variable torsion spring damping rotating shaft above-mentioned, a first through hole is arranged in an end of the movable unit in a direction away from the fixed unit; a protrusion is arranged on an end of the movable unit in a direction close to the fixed unit, a second through hole is arranged inside the protrusion, and the first through hole is communicated with the second through hole; and the first connection mechanism is inserted into the second through hole and the first through hole, and the second connection mechanism is sleeved on the first connection mechanism located in the first through hole.

Optionally, for the variable torsion spring damping rotating shaft above-mentioned, in a direction facing the fixed unit, a third through hole is arranged in the protrusion, the third through hole is communicated with the first through hole, and an end of the torsion spring is inserted into the third through hole.

Optionally, for the variable torsion spring damping rotating shaft above-mentioned, in the direction facing the fixed unit, an annular groove or an annular through hole is arranged in the movable unit, and the fixed unit is inserted into the annular groove or the annular through hole.

Optionally, for the variable torsion spring damping rotating shaft above-mentioned, the annular groove or the annular through hole is arranged concentrically with the second through hole, and a diameter of the annular groove or the annular through hole is larger than a diameter of the second through hole; and the third through hole is located between the first through hole and the second through hole.

Optionally, for the variable torsion spring damping rotating shaft above-mentioned, a fourth through hole is arranged in the fixed unit, the fourth through hole is communicated with the first through hole and the second through hole, and the first connection mechanism is fixedly arranged in the fourth hole.

Optionally, for the variable torsion spring damping rotating shaft above-mentioned, a fifth mounting hole is arranged away from the second through hole and in a surface of the fixed unit in a direction of the fourth through hole, and the torsion spring is inserted into the fifth mounting hole.

Optionally, for the variable torsion spring damping rotating shaft above-mentioned, a fifth mounting hole is arranged away from the second through hole and in a surface of the fixed unit in a direction perpendicular to the fourth through hole, and an end of the torsion spring is inserted into the fifth mounting hole.

Optionally, for the variable torsion spring damping rotating shaft above-mentioned, a rotating part is arranged on a side of the first connection mechanism in a direction away from the second through hole, and an end of the torsion spring is immediately close to the rotating part.

Optionally, the variable torsion spring damping rotating shaft above-mentioned further comprises at least one gasket, the gasket is sleeved on the first connection mechanism, the gasket is located between the torsion spring and the second connection mechanism, and the gasket is located in the first through hole.

The above-mentioned at least one technical solution adopted in the examples of the present disclosure can achieve the following beneficial effects:

Examples of the present disclosure disclose a variable torsion spring damping rotating shaft. By arranging a fixed unit and a movable unit which are detachably installed, when the second connection mechanism rotates on the first connection mechanism, the movable unit is driven to move towards the fixed unit, and then the motion space of the second connection mechanism is enlarged, the torsion spring can be compressed and extended at the maximum, the application range of the variable torsion spring damping rotating shaft is increased, and the installation and disassembly of the fixed unit and the movable unite are more convenient.

The present disclosure also provides a method of manufacturing a variable torsion spring damping rotating shaft. The method may include providing a movable unit, a fixed unit, a first connection mechanism, a second connection mechanism, and a torsion spring; providing the fixed unit that is detachable and is in inserting connection with the movable unit; arranging the first connection mechanism inside the fixed unit, and in a direction away from the movable unit, and connecting the first connection mechanism to an end of the fixed unit; sleeving the torsion spring on the first connection mechanism, providing an end of the torsion spring that is in inserting connection with the fixed unit, and providing another end of the torsion that is in inserting connection with the movable unit; arranging the second connection mechanism in the movable unit and in cooperation with the first connection mechanism; and configuring the second connection mechanism to rotate on the first connection mechanism, to drive the movable unit to move towards the fixed unit.

The method may also include arranging a first through hole in an end of the movable unit in a direction away from the fixed unit; arranging a protrusion on an end of the movable unit in a direction close to the fixed unit, arranging a second through hole in the protrusion, and communicating the first through hole with the second through hole; and inserting the first connection mechanism into the second through hole and the first through hole, and sleeving the second connection mechanism on the first connection mechanism located in the first through hole.

The method may include in a direction towards the fixed unit, arranging a third through hole in the protrusion, communicating the third through hole with the first through hole, and inserting an end of the torsion spring into the third through hole.

The method may also include in the direction facing the fixed unit, arranging an annular groove or an annular through hole in the movable unit, and inserting the fixed unit into the annular groove or the annular through hole.

The method may further include arranging the annular groove or the annular through hole concentrically with the second through hole, wherein a diameter of the annular groove or a diameter of the annular through hole is larger than a diameter of the second through hole; and locating the third through hole between the first through hole and the second through hole.

The above examples of the present disclosure focus on the differences between the various examples, and as long as the different optimization features between the various examples are not contradictory, the different optimization features can be combined to form a better example. Considering the conciseness of the text, the details will not be repeated herein.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above descriptions are only examples of the present disclosure, and are not used to limit the present disclosure. For those skilled in the art, the present disclosure may have various modifications and changes. Any modification, equivalent replacement, improvement, etc. made within the spirit and principle of the present disclosure will be included in the scope of the present disclosure.

The invention claimed is:

1. A variable torsion spring damping rotating shaft, comprising a movable unit, a fixed unit, a first connection mechanism, a second connection mechanism, and a torsion spring;
   a first through hole arranged in an end of the movable unit in a direction away from the fixed unit; and
   a protrusion arranged on an end of the movable unit in a direction close to the fixed unit, a second through hole arranged in the protrusion, wherein the first through hole is communicated with the second through hole,
   wherein the fixed unit is detachable in inserting connection with the movable unit;
   the first connection mechanism is arranged inside the fixed unit, and in a direction away from the movable unit, the first connection mechanism is connected to an end of the fixed unit;
   the torsion spring is sleeved on the first connection mechanism, an end of the torsion spring is in inserting connection with the fixed unit, and another end of the torsion spring is in inserting connection with the movable unit;
   the second connection mechanism is arranged in the movable unit and is in cooperation with the first connection mechanism; and
   the second connection mechanism is configured to rotate on the first connection mechanism, to drive the movable unit to move towards the fixed unit.

2. The variable torsion spring damping rotating shaft according to claim 1, wherein:
   the first connection mechanism is inserted into the second through hole and the first through hole, and the second connection mechanism is sleeved on the first connection mechanism located in the first through hole.

3. The variable torsion spring damping rotating shaft according to claim 2, further comprising:
   at least one gasket, sleeved on the first connection mechanism, and located between the torsion spring and the second connection mechanism and in the first through hole.

4. The variable torsion spring damping rotating shaft according to claim 2, wherein in a direction towards the fixed unit, a third through hole is arranged in the protrusion, the third through hole is communicated with the first through hole, and an end of the torsion spring is inserted into the third through hole.

5. The variable torsion spring damping rotating shaft according to claim 4, wherein in the direction facing the fixed unit, an annular groove or an annular through hole is arranged in the movable unit, and the fixed unit is inserted into the annular groove or the annular through hole.

6. The variable torsion spring damping rotating shaft according to claim 5, wherein:
   the annular groove or the annular through hole is arranged concentrically with the second through hole, and a diameter of the annular groove or a diameter of the annular through hole is larger than a diameter of the second through hole; and
   the third through hole is located between the first through hole and the second through hole.

7. The variable torsion spring damping rotating shaft according to claim 4, wherein a fourth through hole is arranged inside the fixed unit, the fourth through hole is communicated with the first through hole and the second through hole, and the first connection mechanism is fixedly arranged in the fourth hole.

8. The variable torsion spring damping rotating shaft according to claim 7, wherein a fifth mounting hole is arranged away from the second through hole and in a surface of the fixed unit in a direction of the fourth through hole, and the torsion spring is inserted into the fifth mounting hole.

9. The variable torsion spring damping rotating shaft according to claim 7, wherein a fifth mounting hole is arranged away from the second through hole and in a surface of the fixed unit in a direction perpendicular to the fourth through hole, and an end of the torsion spring is inserted into the fifth mounting hole.

10. The variable torsion spring damping rotating shaft according to claim 7, wherein a rotating part is arranged on a side of the first connection mechanism in a direction away from the second through hole, and an end of the torsion spring is immediately close to the rotating part.

11. A method of manufacturing a variable torsion spring damping rotating shaft, comprising:
    providing a movable unit, a fixed unit, a first connection mechanism, a second connection mechanism, and a torsion spring;
    arranging a first through hole in an end of the movable unit in a direction away from the fixed unit;
    arranging a protrusion on an end of the movable unit in a direction close to the fixed unit, arranging a second through hole in the protrusion, and communicating the first through hole with the second through hole;
    providing the fixed unit that is detachable and is in inserting connection with the movable unit;
    arranging the first connection mechanism inside the fixed unit, and in a direction away from the movable unit, and connecting the first connection mechanism to an end of the fixed unit;
    sleeving the torsion spring on the first connection mechanism, providing an end of the torsion spring that is in inserting connection with the fixed unit, and providing another end of the torsion spring that is in inserting connection with the movable unit;

arranging the second connection mechanism in the movable unit and in cooperation with the first connection mechanism; and configuring the second connection mechanism to rotate on the first connection mechanism, to drive the movable unit to move towards the fixed unit.

12. The method of claim 11, further comprising:

inserting the first connection mechanism into the second through hole and the first through hole, and sleeving the second connection mechanism on the first connection mechanism located in the first through hole.

13. The method of claim 12, further comprising:

in a direction towards the fixed unit, arranging a third through hole in the protrusion, communicating the third through hole with the first through hole, and inserting an end of the torsion spring into the third through hole.

14. The method of claim 13, further comprising:

in the direction facing the fixed unit, arranging an annular groove or an annular through hole in the movable unit, and inserting the fixed unit into the annular groove or the annular through hole.

15. The method of claim 14, further comprising:

arranging the annular groove or the annular through hole concentrically with the second through hole, wherein a diameter of the annular groove or a diameter of the annular through hole is larger than a diameter of the second through hole; and locating the third through hole between the first through hole and the second through hole.

* * * * *